United States Patent
Ohta et al.

(10) Patent No.: US 8,042,117 B2
(45) Date of Patent: Oct. 18, 2011

(54) OPERATING SYSTEM SWITCHING CONTROL DEVICE AND COMPUTER SYSTEM

(75) Inventors: Ken Ohta, Yokohama (JP); Takehiro Nakayama, Yokohama (JP); Hisatoshi Eguchi, Yokosuka (JP); Yu Inamura, Kawasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 1116 days.

(21) Appl. No.: 11/782,916

(22) Filed: Jul. 25, 2007

(65) Prior Publication Data

US 2008/0184274 A1    Jul. 31, 2008

(30) Foreign Application Priority Data

Jul. 25, 2006 (JP) ............................. P2006-202603
Jun. 28, 2007 (JP) ............................. P2007-171099

(51) Int. Cl.
    *G06F 3/00* (2006.01)
    *G06F 13/24* (2006.01)
(52) U.S. Cl. ......... 719/310; 719/328; 719/330; 710/261
(58) Field of Classification Search .................. 719/319, 719/328, 310, 330; 718/108; 710/261
    See application file for complete search history.

(56) References Cited

U.S. PATENT DOCUMENTS

| | | | |
|---|---|---|---|
| 6,347,370 B1 | 2/2002 | Grimsrud | |
| 6,615,303 B1 * | 9/2003 | Endo et al. | 710/260 |
| 6,618,813 B1 | 9/2003 | Hsu et al. | |
| 6,715,016 B1 * | 3/2004 | Ohno et al. | 710/260 |
| 6,782,484 B2 | 8/2004 | McGowan et al. | |
| 6,851,065 B2 | 2/2005 | Lo et al. | |
| 7,082,529 B2 | 7/2006 | Cantwell et al. | |
| 7,100,037 B2 | 8/2006 | Cooper | |
| 7,464,180 B1 * | 12/2008 | Jacobs et al. | 709/240 |
| 7,598,852 B2 * | 10/2009 | Chriss | 340/539.12 |
| 2001/0018717 A1 | 8/2001 | Shimotono | |
| 2004/0148536 A1 | 7/2004 | Zimmer et al. | |
| 2005/0149933 A1 | 7/2005 | Saito et al. | |
| 2006/0070032 A1 | 3/2006 | Bramley et al. | |
| 2006/0161796 A1 | 7/2006 | Cromer et al. | |

FOREIGN PATENT DOCUMENTS

EP    1 054 322 A2    11/2000

(Continued)

OTHER PUBLICATIONS

Jason Hill, System ARchitecture Directions for Networked Sensors, 2000.*

*Primary Examiner* — Lechi Truong
(74) *Attorney, Agent, or Firm* — Oblon, Spivak, McClelland, Maier & Neustadt, L.L.P.

(57) ABSTRACT

In a computer system according to the present invention, a switch-source OS controller unit includes: a OS switch request receiver unit configured to receive an OS switch request for requesting that the switch-destination OS in a suspend status becomes the OS in the active status; a switch event notifying unit configured to notify event information to the switch-destination OS or an application on the switch-destination OS, the event information being included in the received OS switch request, and requesting the switch-destination OS or the application on the switch-destination OS to perform a process; and a switch controller unit configured to call the OS switching function, by using the event information as an argument, so that the switch-destination OS becomes the OS in the active status.

3 Claims, 12 Drawing Sheets

FOREIGN PATENT DOCUMENTS

| | | |
|---|---|---|
| EP | 1 054 322 A3 | 11/2000 |
| JP | 6-337728 | 12/1994 |
| JP | 11-85546 | 3/1999 |
| JP | 2001-256066 | 9/2001 |
| JP | 2001-282558 | 10/2001 |
| JP | 2004-252761 | 9/2004 |
| JP | 2005-202691 | 7/2005 |
| JP | 2006-4092 | 1/2006 |
| WO | WO 2006/018307 A2 | 2/2006 |
| WO | WO 2006/018307 A3 | 2/2006 |

* cited by examiner

FIG. 3

| EVENT INFORMATION | EVENT PROCESS |
|---|---|
| INCOMING TELEPHONE CALL | ACTIVATING TELEPHONE APPLICATION |
| INCOMING VoIP CALL | ACTIVATING VoIP APPLICATION |
| INCOMING MAIL | ACTIVATING MAIL APPLICATION |
| INCOMING SMS | ACTIVATING SMS MANAGEMENT APPLICATION |
| TIMER EXPIRATION | TACTIVATING TIMER MANAGEMENT APPLICATION |
| APPLICATION ACTIVATING REQUEST | ACTIVATING DESIGNATED APPLICATION |
| SWITCH BUTTON INPUT | DOING NOTHING |

FIG. 4

| PROCESS TYPE | SWITCH PROHIBITION PROCESS FLAG |
|---|---|
| DURING TELEPHONE COMMUNICATION | YES |
| DURING DATA COMMUNICATION | YES |
| DURING WRITING IN FILE | NO |
| DURING READING FILE | YES |

FIG. 5

| PROCESS TYPE | LOCK REQUEST COUNT |
|---|---|
| DURING TELEPHONE COMMUNICATION | 1 |
| DURING DATA COMMUNICATION | 2 |
| DURING WRITING IN FILE | 0 |
| DURING READING FILE | 1 |

FIG. 6

| PROCESS TYPE / EVENT INFORMATION | DURING TELEPHONE COMMUNICATION | DURING DATA COMMUNICATION | DURING WRITING IN FILE | DURING READING FILE |
|---|---|---|---|---|
| SWITCH BUTTON INPUT | PROHIBITION | PROHIBITION | PERMISSION (INQUIRY) | PERMISSION |
| INCOMING TELEPHONE CALL | PROHIBITION | PERMISSION | PERMISSION | PERMISSION |
| INCOMING DATA CALL | PROHIBITION | PROHIBITION | PROHIBITION | PERMISSION |
| TIMER EXPIRATION | PROHIBITION | PERMISSION (INQUIRY) | PROHIBITION | PERMISSION |
| APPLICATION ACTIVATING REQUEST | PROHIBITION | PERMISSION (INQUIRY) | PROHIBITION | PERMISSION (INQUIRY) |

FIG. 7A

| EVENT INFORMATION | PRIORITY |
|---|---|
| SWITCH BUTTON INPUT | 2 |
| INCOMING TELEPHONE CALL | 1 |
| INCOMING DATA CALL | 5 |
| TIMER EXPIRATION | 3 |
| APPLICATION ACTIVATING REQUEST | 4 |

FIG. 7B

| PROCESS TYPE / PRIORITY | DURING TELEPHONE COMMUNICATION | DURING DATA COMMUNICATION | DURING WRITING IN FILE | DURING READING FILE |
|---|---|---|---|---|
| 0 | PERMISSION | PERMISSION | PERMISSION | PERMISSION |
| 1 | PROHIBITION | PERMISSION | PERMISSION | PERMISSION |
| 2 | PROHIBITION | PROHIBITION | PERMISSION (INQUIRY) | PERMISSION |
| 3 | PROHIBITION | PERMISSION (INQUIRY) | PROHIBITION | PERMISSION |
| 4 | PROHIBITION | PERMISSION (INQUIRY) | PROHIBITION | PERMISSION (INQUIRY) |
| 5 | PROHIBITION | PROHIBITION | PROHIBITION | PERMISSION |
| ⋮ | ⋮ | ⋮ | ⋮ | ⋮ |

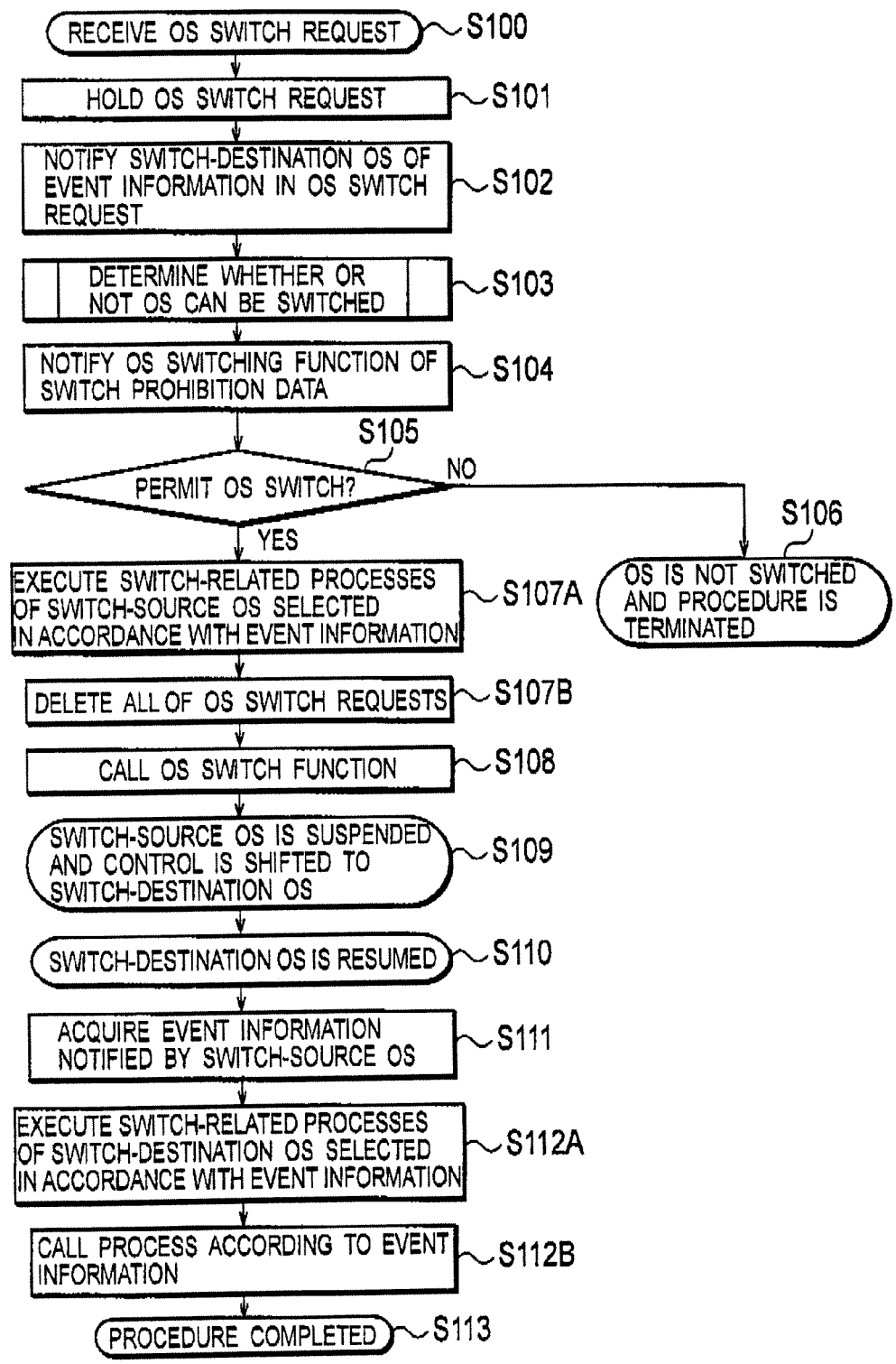

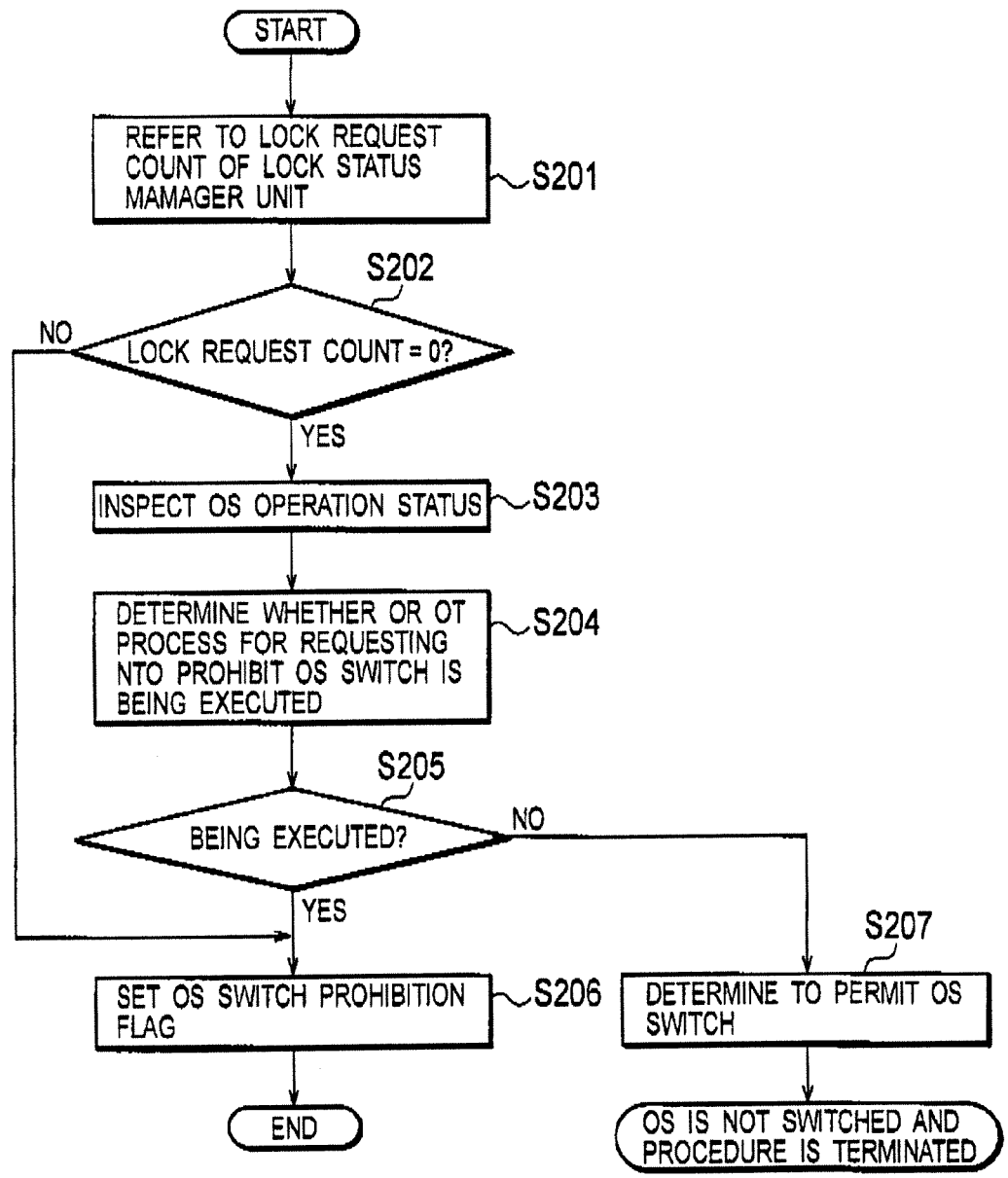

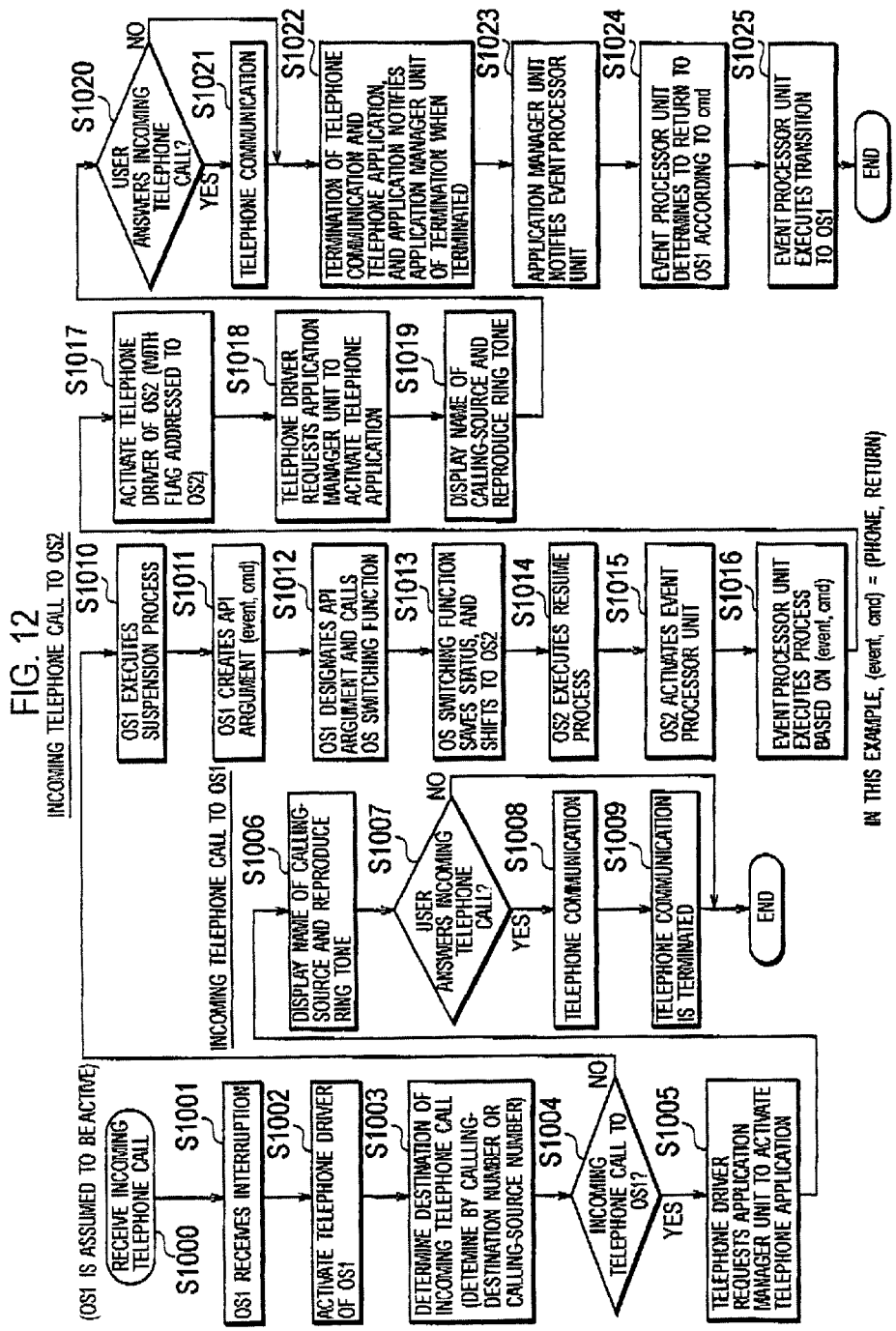

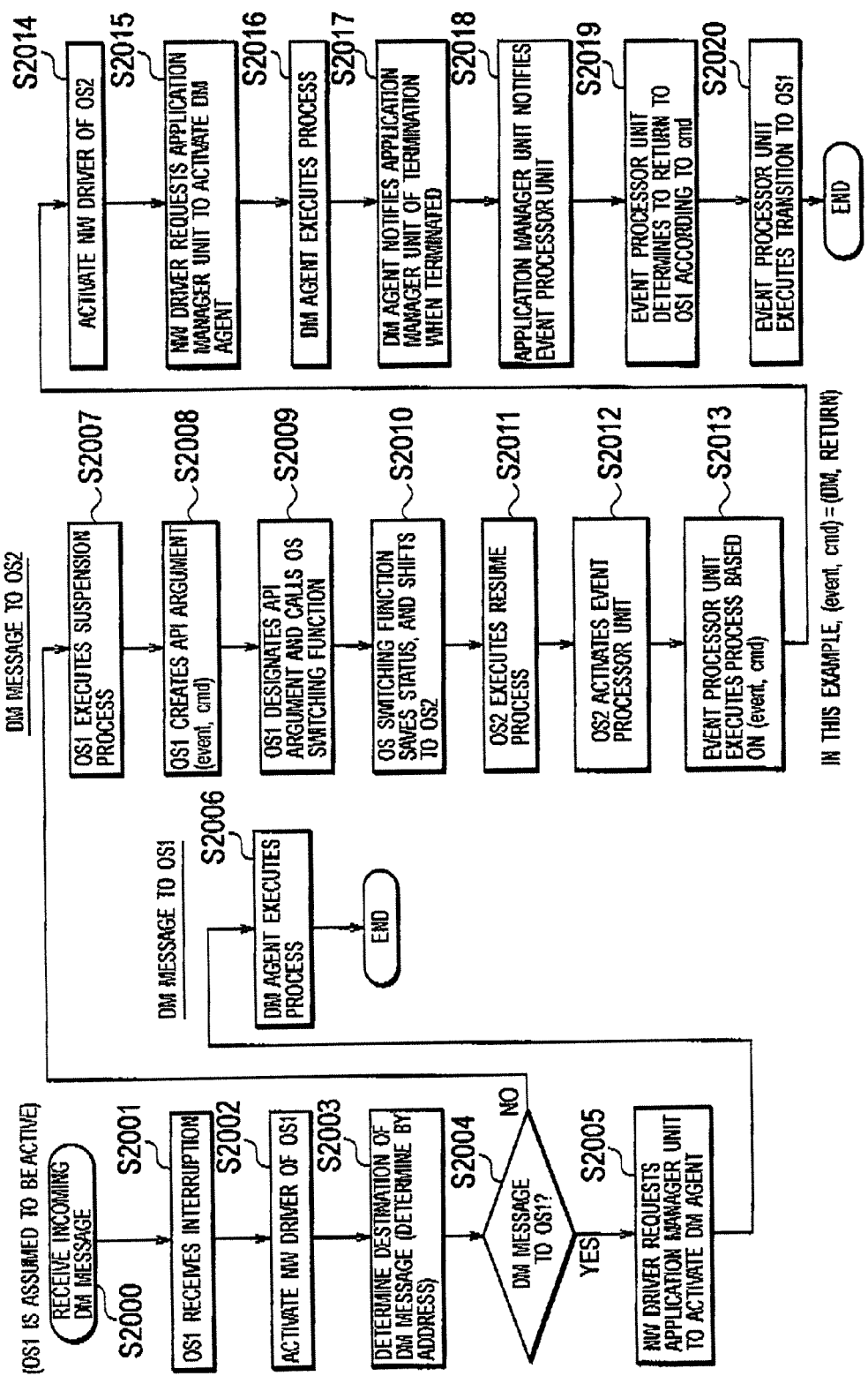

OPERATING SYSTEM SWITCHING CONTROL DEVICE AND COMPUTER SYSTEM

CROSS REFERENCE TO RELATED APPLICATION

This application is based upon and claims the benefit of priority from the prior Japanese Patent Applications No. 2006-202603 filed on Jul. 25, 2006, and P2007-171099 filed on Jun. 28, 2007; the entire contents of which are incorporated herein by reference.

And, the entire contents of the US laid-open disclosure public patent bulletin No. 20010018717A1 which are incorporated herein by reference.

BACKGROUND OF THE INVENTION

1. Field of the Invention

The present invention relates to an operating system switching control device provided in a computer system comprising an operating system switching function of exclusively switching an operating system in an active status from one operating system (called a switch-source operating system) to another operating system (called a switch-destination operating system).

In addition, the present invention further relates to a computer system which includes a plurality of operating systems each exclusively becoming an operating system in an active status, or a plurality of virtual operating systems provided by a single operating system with a plurality of setting modes, and in which an operating system switching function exclusively switches an operating system in the active status from a switch-source operating system to a switch-destination operating system 2. Description of the Related Art Conventionally, there has been known a configuration in which a plurality of operating systems (hereinafter referred to as OSs) is installed on a computer system (terminal) so that an OS in an active status can be switched between the OSs.

In the above-mentioned configuration, a suspend/resume function of OS is utilized, and a first OS in the active status becomes in a suspend status (a paused status), and thereafter a second OS in the suspend status is resumed, so that the OS in the active status is exclusively switched.

In other words, if one OS (a first OS) is in the active status, the other OS (a second OS) is in the suspend status (an inactive status).

With the application of the above-mentioned configuration, it is possible to built a computer system with two (or more) execution environments (also referred to as domains) having different usages or OS types.

For example, it is possible to build a computer system in which executable public and private domains coexist by switching an OS in the active status between a first OS used for process on private information and a second OS used for process on business information.

In addition, it is possible to build a computer system by using "Linux OS (registered trademark)" for the first OS and "Windows Mobile (registered trademark)" for the second OS.

In the above-mentioned configuration, each of the plurality of OSs exclusively becomes in the active status, and therefore an OS in the suspend status (an inactive OS) needs to be switched to become in the active status in order to perform a process.

Here, a possible trigger for switching the inactive OS to become in the active status is an event (a switch event) such as "an push of a switch button by a user", "a reception of a telephone call or data call whose destination is the inactive OS", "a request for executing a function on the inactive OS", or "an expiration of a timer registered by the inactive OS".

Accordingly, in the above-mentioned configuration, there is a challenge that, when an OS in the active status is switched from a switch-source OS to a switch-destination OS in response to an occurrence of the above-mentioned switch event, it is necessary to notify such switch event to the switch-destination OS, and to perform a suitable process for the switch event in the switch-destination OS.

In particular, a switch-destination OS is required to promptly perform a process for an urgent event (a switch event) such as reception of an incoming telephone call. For this reason, there is a need to reduce a time required for switching from a switch-source OS to a switch-destination OS.

Furthermore, a first challenge in the above-mentioned technique is to prevent a critical process from being interrupted by switching an OS in the active status.

More specifically, there is a problem that, since it is desired to reject or suspend the switching of the OS in the active status during executing the critical process such as process for a telephone call which is not desirable to be interrupted, even if a switch event occurs, it is necessary to lock the switching of the OS in the active status during executing the critical process.

A second challenge is to improve failure tolerance in the switching an OS in the active status.

Specifically, when means for locking the switching of the OS in the active status is used in order to achieve the first challenge, there is a possibility that the lock is not properly unlocked due to a failure, and that the switching of the OS in the active status becomes impossible. For this reason, it is necessary to achieve the second challenge to maintain the function of switching an OS in the active status even if a failure occurs.

BRIEF SUMMARY OF THE INVENTION

The present invention has been made in view of the forgoing challenges. Accordingly, an object of the present invention is to provide an operating system switching control device and a computer system, which are capable of executing the switch processes of the switch-source OS and the switch-destination OS which are selected in accordance with to event information, while reducing a time required for switching from a switch-source OS to a switch-destination OS and a time required for performing a process for a switch event addressed to is an inactive OS. In order to reduce these times, the operating system switching control device and the computer system are capable of changing the switch process very flexibly in response to an occurring switch event by allowing the switch processes corresponding to the event information to be optimized.

In addition, an object of the present invention is to provide an operating system switching control device and a computer system, which are capable of executing safely the switching of an OS in the active status by checking whether or not a process to prohibit the switching of the OS in the active status is being executed.

A first aspect of the present invention is summarized as an operating system switching control device provided in a computer system comprising an operating system switching function of exclusively switching an operating system in an active status from a switch-source operating system to a switch-destination operating system, including: a switch-source operating system controller unit configured to operate when the switch-source operating system is in the active status; wherein the switch-source operating system controller unit includes: an operating system switch request receiver unit configured to receive an operating system switch request for requesting that the switch-destination operating system in a suspend status becomes the operating system in the active status; a switch event notifying unit configured to notify event information to the switch-destination operating system or an application on the switch-destination operating system, the event information being included in the received operating system switch request, and requesting the switch-destination operating system or the application on the switch-destination operating system to perform a process; and a switch controller unit configured to call the operating system switching function, by using the event information as an argument, so that the switch-destination operating system becomes the operating system in the active status.

In the first aspect, the switch controller unit can be configured to further perform a switch process of a switch-source operating system selected in accordance with the event information.

In the first aspect, the operating system switching control device can further include a switch-destination operating system controller unit configured to operate when the switch-destination operating system is in the active status; wherein the switch-destination operating system controller unit can include: a switch event acquiring unit configured to acquire the event information after the switch-destination operating system becomes the operating system in the active status; and an event processor unit configured to execute an event process corresponding to the acquired event information.

In the first aspect, the switch controller unit can be configured to further perform a switch process on a switch-destination operating system selected in accordance with the acquired event information.

In the first aspect, the switch-source operating system controller unit can include a switch judgment unit configured to determine whether or not the switch-source operating system can become the operating system in a suspend status; and when it is determined that the switch-source operating system can become the operating system in the suspend status, the switch controller unit can be configured to instruct the operating system switching function that the switch-destination operating system becomes the operating system in the active status.

In the first aspect, the switch-source operating system controller unit can include: a switch lock request receiver unit configured to receive a switch lock request for requesting to prohibit or stop prohibiting that the switch-source operating system becomes the operating system in the suspend status; and the switch judgment unit is configured to determine whether or not the switch-source operating system can become the operating system in the suspend status, in accordance with the received switch lock request.

In the first aspect, the switch lock request receiver unit can be configured to receive the switch lock request including a priority; the operating system switch request receiver unit can be configured to receive the operating system switch request including a priority; and the switch judgment unit can be configured to determine whether or not the switch-source operating system can become the operating system in the suspend status, in accordance with the priority of the received switch lock request and the priority of the received operating system switch request.

In the first aspect, the switch-source operating system controller unit can include an activity notifying unit configured to periodically notify, to the operating system switching function, that the operating system switching control device operates normally.

In the first aspect, the switch-source operating system control unit can include an operation inspector unit configured to monitor an executing process which is being executed in the switch-source operating system; and the switch judgment unit can be configured to determine whether or not the switch-source operating system can become the operating system in the suspend status, in accordance with the executing process.

In the first aspect, the switch-source operating system control unit can include an switching permission information manager unit configured to manage information on whether or not the switch-source operating system can become the operating system in the suspend status, for a combination of the event information and a process type for specifying the executing process; the operation inspector unit is configured to monitor whether or not a process specified by the process type is being executed in the switch-source operating system; and the switch judgment unit is configured to determine whether or not the switch-source operating system can become the operating system in the suspend status, in accordance with the combination of the process type for specifying the executing process and the notified event information, by referring to the switching permission information manager unit.

In the first aspect, the switch-source operating system controller unit can include an switching permission information manager unit configured to manage information on whether or not the switch-source operating system can become the operating system in the suspend status, for a combination of the event information and a process type for specifying the executing process; and the switch lock request receiver unit is configured to receive the switch lock request for every process type; the switch judgment unit can be configured to determine whether or not the switch-source operating system can become the operating system in the suspend status, in accordance with the combination of the process type corresponding to the switch lock request and the notified event information, by referring to the switching permission information manager unit.

In the first aspect, the switch-source operating system controller unit can include a user inquiring unit configured to make an inquiry to a user about whether or not the switch-source operating system can become the operating system in the suspend status; the switching permission information manager unit can be configured to manage, for the combination of the event information and the process type, whether or not an inquiry needs to be made to a user about whether or not the switch-source operating system can become the operating system in the suspend status; and the switch judgment unit can be configured to determine whether or not the switch-source operating system can become the operating system in the suspend status, in accordance with a result of making the inquiry to the user.

A second aspect of the present invention is summarized as a computer system which includes a plurality of operating systems each exclusively becoming an operating system in an active status, or a plurality of virtual operating systems provided by a single operating system with a plurality of setting modes, and in which an operating system switching function exclusively switches an operating system in the active status from a switch-source operating system to a switch-destination operating system, the computer system including: an operating system switching control device configured to operate when the switch-destination operating system is in the active status; wherein the operating system switching control device includes: an operating system switch request receiver unit configured to receive an operating system switch request for requesting that a switch-destination operating system in a suspend status becomes an operating system in the active status; a switch event notifying unit configured to notify event information to the switch-destination operating system or an application on the switch-destination operating system, the event information being included in the received operating system switch request, and requesting the switch-destination operating system or the application on the switch-destination operating system to perform a process; and a switch controller unit configured to call the operating system switching function, by using the event information as an argument, so that the switch-destination operating system becomes the operating system in the active status.

In the second aspect, the switch controller unit can be configured to further perform a switch process of the switch-source operating system selected in accordance with the event information.

BRIEF DESCRIPTION OF THE SEVER VIEWS OF THE DRAWINGS

FIG. 3 is a table showing an example of a "table managing combinations of event information and event processes" to be referred by an event processor unit in the operating system switching control device installed on the computer system according to the first embodiment of the present invention.

FIG. 4 is a table showing an example of an "operating status management table" managed by an operation inspector unit in the operating system switching control device installed on the computer system according to the first embodiment of the present invention.

FIG. 5 is a diagram showing an example of a "lock status management table" managed by a lock status manager unit in the operating system switching control device installed on the computer system according to the first embodiment of the present invention.

FIG. 6 is a table showing an example of a "switching permission information managing table" managed by a switching permission information manager unit, of the operating system switching control device installed on the computer system according to the first embodiment of the present invention;

FIGS. 7A and 7B are tables showing an example of the "switching permission information managing table" managed by the switching permission information manager unit, of the operating system switching control device installed on the computer system according to the first embodiment of the present invention;

FIG. 8 is a flowchart showing a procedure of switching an OS in the computer system according to the first embodiment of the present invention;

FIG. 9 is a flowchart showing a procedure of determining whether or not an OS can be switched in the computer system according to the first embodiment of the present invention.

FIG. 12 is a flowchart showing an operation of receiving an incoming telephone call in the computer system according to the first embodiment of the present invention.

FIG. 13 is a flowchart showing an operation of receiving a incoming DM message in the computer system according to the first embodiment of the present invention.

DETAILED DESCRIPTION OF THE INVENTION

Computer System According to First Embodiment of the Present Invention

By referring to FIGS. 1 to 7, description will be given of a configuration of a computer system according to a first embodiment of the present invention.

A computer system 1 according to this embodiment has a configuration on which a plurality of OS1 and OS2 that each operate exclusively, and in which an OS in the active status (an active OS) is switched by an OS switching function 2.

The OS switching function 2 is configured to switch among a plurality of physically different OSs, and to switch among a plurality of virtual OSs.

Here, at the time of switching among the plurality of physically different OSs, the OS1 and OS2 are executed by different programs.

As for switching among the plurality of OSs, a status of hardware, an OS, or an application, when a switch-source OS is in the active status, is suspended (saved), and a status of hardware, an OS, or an application, when a switch-destination OS is in the active status, is resumed (restarted).

Figure 1:
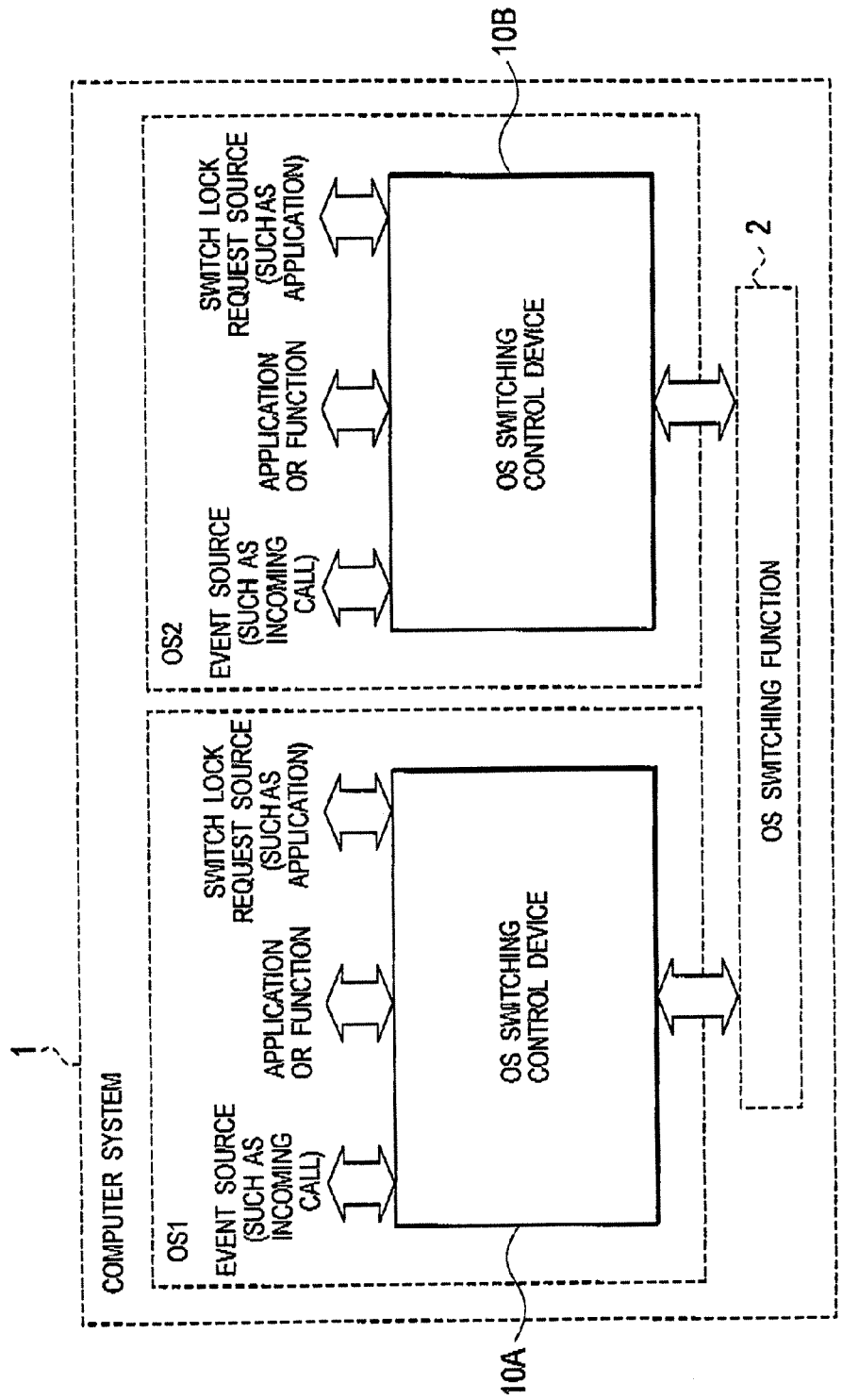
FIG. 1 is a configuration diagram of a computer system according to a first embodiment of the present invention.

As shown in FIG. 1, the computer system according to this embodiment is provided with an OS switching control device 10A for the OS1 and an OS switching control device 10B for the OS2.

Since the above-mentioned OS switching control devices 10A and 10B basically have a same configuration, the description will be given of the configuration of the OS switching control device 10A.

Figure 2:
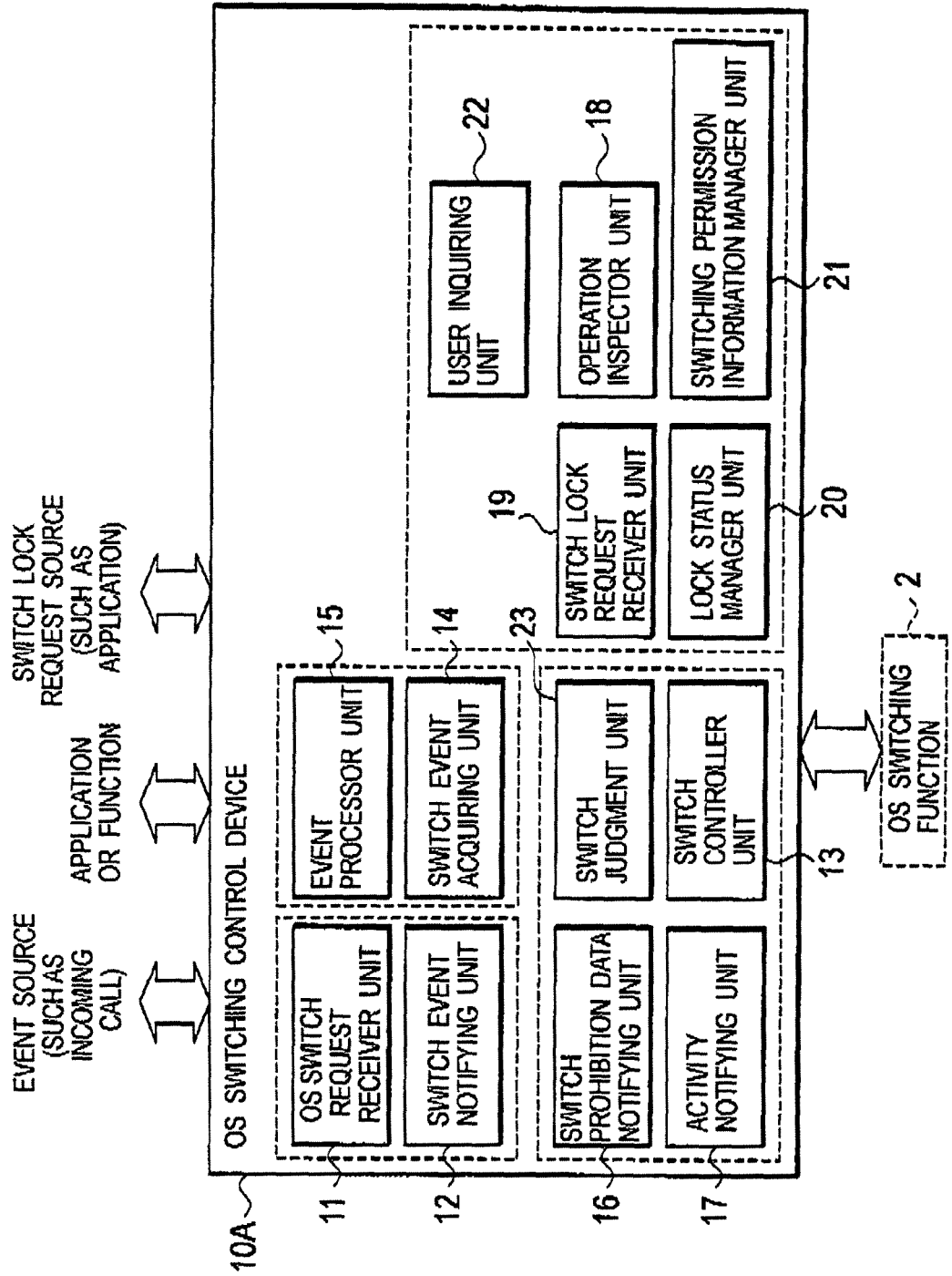
FIG. 2 is a functional block diagram of an operating system switching control device, installed on the computer system according to the first embodiment of the present invention.

As shown in FIG. 2, the OS switching control device 10A is provided with an OS switch request receiver unit 11, a switch event notifying unit 12, a switch controller unit 13, a switch event acquiring unit 14, an event processor unit 15, a switch prohibition data notifying unit 16, an activity notifying unit 17, an operation inspector unit 18, a switch lock request receiver unit 19, a lock status manager unit 20, a switching permission information manager unit 21, a user inquiring unit 22, and a switch judgment unit 23.

It is to be noted that functions 11 to 23 composing the OS switching control device 10A can be classified into two kinds: a switch-source OS controller unit which operates if the OS switching control device 10A is provided in the switch-source OS; and a switch-destination OS controller unit which operates it the OS switching control device 10A is provided in the switch-destination OS.

Here, the switch-source OS controller unit is provided with the OS switch request receiver unit 11, the switch event notifying unit 12, the switch controller unit 13, the switch prohibition data notifying unit 16, the activity notifying unit 17, the operation inspector unit 18, the switch lock request receiver unit 19, the lock status manager unit 20, the switching permission information manager unit 21, the user inquiring unit 22, and the switch judgment unit 23.

On the other hand, the switch-destination OS controller unit includes the switch event acquiring unit 14 and the event processor unit 15.

Here, the OS switching control device 10A is provided in the computer system 1 including an OS switching function 2 which exclusively switches an OS in the active status (an active OS) from the switch-source OS1 to the switch-destination OS2.

Specifically, all of the functions 11 to 23 composing the above-mentioned OS switching control device 10A may be provided inside the OS1, or may be provided outside the OS1.

In addition, it is also possible that a part of the functions 11 to 23 composing the above-mentioned OS switching control device 10A may be provided inside the OS1 and the rest of the functions 11 to 23 may be provided outside the OS1.

Furthermore, the functions 11 to 23 composing the OS switching control device 10A may be implemented by software or hardware.

The OS switch request receiver unit 11 is configured to receive an OS switch request for requesting that the switch-destination OS2 in the suspend status becomes an OS in the active status.

Specifically, the OS switch request receiver unit 11 is configured to show a cause (a switch event) of switching the OS in the active status, and to receive and hold the OS switch request including "event information" requesting the process by an application on the switch-destination OS2, or by the switch-destination OS2.

For example, the OS switch request receiver unit 11 may be configured to receive an OS switch request in any receiving mode, such as a function call in accordance with the "Application Programming Interface (API)" disclosed by the OS switching control device 10A, a message passing or the like, For example, as a specific example of the function based on the API, a design such as "OS_Switch_Event_Receive (event, param)" is possible in which "event" indicating event information and an additional parameter "param" are used as arguments.

In addition, the OS switch request receiver unit 11 may receive an OS switch request including event information requesting the switch-source OS2 to make notification.

For example, as the above-mentioned event information, it is possible that a time in the future is set, and that notification is requested when the time comes.

Furthermore, the OS switch request receiver unit 11 may be configured to receive an OS switch request including a priority.

The switch event notifying unit 12 is configured to notify event information to the OS2 which is the switch-destination OS (the OS switching control device 10B for the OS2 or the application on the OS2).

The event information is included in the received OS switch request, and requests a process by the application on the switch-destination OS or by the switch-destination OS.

For example, the switch event notifying unit 12 may be configured to notify the OS2 of event information by using asynchronous-message passing means for performing asynchronous message passing which writes a message on a region shared with the OS2, or to notify the OS2 of the event information by using another communication means.

Note that each of the OS1 and OS2 is configured to operate exclusively. In other words, if the OS is in the active status, the OS2 is in the inactive status (the suspend status).

Accordingly, the switch event notifying unit 12 notifies the OS2 of the event information not by synchronous type communication means such as a TCP/IP socket or the like but by asynchronous communication means.

For example, the switch event notifying unit 12 can notify the OS2 of the event information by calling the function such as "OS_Switch_Event (osid, event, parm)".

Here, the "osid" denotes an identifier of the source-destination OS; the "event" denotes event information indicating a cause (a switch event) of switching an active OS (for example, reception of an incoming telephone call, reception of a incoming mail, a switching button input, an application activating request from another OS, or the like); and the "param" denotes an additional parameter dependent on the event information.

If an OS switch prohibition flag is not set by the determination unit 23, that is, when it is determined that the switch-source OS1 can become an OS in the suspend status (when it is determined that OS in the active status can be switched), the switch controller unit 13 is configured to execute the switch process of the switch-source OS selected in accordance with the event information, to delete all of the OS switch requests held by the OS switch request receiver unit 11, to call the OS switching function 2 by using the event information as an argument, and thereby to instruct the OS2 being an inactive OS to become an OS in the active status.

For example, if a switch event of receiving an incoming telephone call occurs as the switch process of the switch-source OS as described above, in order to reduce a call-receiving process time, it is assumed that a status of communication device relating to the telephone call is saved in a region shared with the switch-destination OS or that one part of an encryption process or a deleting process for protecting data or the like on a memory or storage of the switch-source OS is omitted.

In addition, as an example of utilizing the event information that the OS switching function 2 receives as the argument, it can be considered that storing (suspending) a status of one part of hardware, an OS, or an application is omitted.

If a user inquiring flag is set by the switch judgment unit 23, the switch controller unit 13 may call a user inquiring unit 22 and determine whether or not the OS switching function 2 is called, in response to a result of inquiry on the user by the user inquiring unit 22.

The switch event acquiring unit 14 is configured to acquire the event information notified by the OS switching control device 10B for the OS2 after the OS1 becomes in the active status.

In other words, the switch event acquiring unit 14 is configured to acquire the event information notified by the switch-source OS2, after the OS in the active status is switched.

It is to be noted that, similar to the switch event notifying unit 12, the switch event acquiring unit 14, for example, may acquire the event information by using means for performing asynchronous message passing which writes a message on a region shared between the OS1 and OS2, or may acquire the event information by using another means of communications.

The event processor unit 15 is configured to perform the switch process of the switch-destination OS selected corresponding to the event information acquired by the switch event acquiring unit 14 and the event process.

For example, as switch process of the above-mentioned switch-destination OS, it is assumed that a status of the communication device saved in the region shared with the switch-source OS in order to promptly process an urgent switch event such as receiving an incoming telephone call, is recovered, or that decoding of the data on the memory or storage is put off (to reduce the amount of process).

For example, the event processor unit 15 is configured to prepare a "table of managing combinations of event information and event process" as shown in FIG. 3, to select suitable process (event process) by using a key of the event information acquired by the switch event acquiring unit 14, so that the above-mentioned process can be called.

In the example of FIG. 3, if event information of receiving an incoming telephone call is acquired, the event processor unit 15 determines that the event process of activating a telephone application is requested, and executes such event process.

If event information of an application activating request for requesting to activate an application is acquired, the event processor unit 15 determines that the event process of activating an application designated by the application activating request is requested, and executes such event process.

In addition, in the example of FIG. 3, if event information of a switching button input is acquired, the event processor unit 15 determines that special event process is not requested, and does not execute the special event process.

Incidentally, it may be possible to embed event process corresponding to the event information, themselves, in a program that implements the event processor unit 15, instead of preparing a table shown in FIG. 3, in the event processor unit 15.

Furthermore, in a case where the execution of the event process is failed, because the application cannot be activated, even if the event process corresponding to the event invention is tried to be executed, or in a case where the event process can be normally executed, the event processor unit 15 may notify the OS switching control device 10B for the switch-source OS2 of the execution result.

The switch prohibition data notifying unit 16 is configured to notify the OS switching function 2 of OS switch prohibition data.

For example, the switch prohibition data notifying unit 16 is configured to notify the OS switching function 2 of the OS switch prohibition data, by writing the OS switch prohibition data in the region shared between the OS switching function 2 and the OS switching control device 10B or in a region designated by the OS switching function 2.

Here, the OS switch prohibition data includes information indicating whether or not an OS in the active status can be switched (for example, an OS switch prohibition flag) and information of a reason why the switching of the OS in the active status is prohibited.

For example, the switch prohibition data notifying unit 16 is configured to notify the OS switching function 2 of the OS switch prohibition data, by calling a function such as "OS_Switch_Control (flag, status, alive")".

Here, the "flag" denotes an OS switch prohibition flag being the information indicating whether or not the OS in the active status can be switched; the "status" denotes a reason of prohibiting the switching of the OS in the active status (for example, during a telephone communication or data communications, or the like); and the "alive" denotes the information indicating that the OS1 (or the OS switching control device 10A) is alive (such as a time stamp and a count).

The activity notifying unit 17 is configured to notify the OS switching function 2 of the fact that the OS1 (or the OS switching control device 10A) is normally operated by periodically notifying the OS switching function 2 of predetermined information.

It is to be noted that the activity notifying unit 17 may notify the OS switching function 2 of the predetermined information with similar means to that of the switch prohibition data notifying unit 16, or may notify the OS switching function 2 of the predetermined information with another means.

Here, as one example of the predetermined information to be notified, an increasing counter, time information (time stamp), or the like can be pointed out.

The OS switching function 2 can determine that a failure is occurred in the OS switching control device 10A, in a case where the above-mentioned counter is not increased for a predetermined period of time or more, or in a case where the time information is not updated.

In such cases, the OS switching function 2 may be configured to delete or ignore the received OS switch prohibition data, or may be configured to perform hardware reset (reboot) of the computer system 1 itself.

The operation inspector unit 18 is configured to monitor an executing process which is being executed in the OS1 in which the OS switching control device 10A is arranged.

For example, as shown in FIG. 4, the operation inspector unit 18 manages an "operating status management table" which associates a "process type" with a "switch prohibition process flag".

Here, the "process type" is for specifying a specific process which requests prohibition of switching the OS in the active status, whereas the "switch prohibition process flag" is for indicating whether or not the process specified by the "process type" is in execution.

It is to be noted that if the "switch prohibition process flag" is set, it indicates that the process specified by the "process type" is in execution.

In addition, the operation inspector unit 18 can monitor the executing process which is being executed in the OS1 including at least any one of a process activating status, a network connecting status, and a file input/output status.

Accordingly, the operation inspector unit 18 can detect that a specific process is being executed such as: a critical process is being executed; a network connection is made with a specific destination; writing is performed in a region of a specific file or storage.

The above-mentioned specific process may be given to the operation inspector unit 18, in a form of a process name, an address of network connecting destination, a file name, a path name, or the like.

Alternately, the above-mentioned specific process may be given, in a form of being embedded in the operation inspector unit 18 as a program.

In addition, the operation inspector unit 18 may output information on the "process type", in addition to information on whether or not the process specified by the "process type" is being executed (setting of the switch prohibition process flag).

It is to be noted that as one example of the information on the "process type", a type of activating application, a name of file being written, and the like can be pointed out.

The switch lock request receiver unit 19 is configured to receive a switch lock request for requesting to prohibit or stop prohibiting the switching of the OS in the active status.

For example, the switch lock request receiver unit 19 is configured to receive a switch lock request with any communication means such as calling of a function in accordance with the API, message passing, or the like.

It is to be noted that the switch lock request receiver unit 19 is configured to receive a switch lock request from an OS, a driver, an application, a middleware, or the like.

In addition, the switch lock request receiver unit 19 may be configured to receive a switch lock request including a priority.

The lock status manager unit 20 is configured to update a lock request count indicating the number of receiving valid switch lock requests for requesting prohibition of switching the OS in the active status, in response to the reception of the switch lock request.

Specifically, in a case where a switch lock request for making a request to prohibit the switching of the OS in the active status is received, the lock status manager unit 20 performs an operation of increasing the lock request count by one.

In a case where a switch lock request for making a request to stop prohibiting the switching of the OS in the active status is received, the lock status manager unit 20 performs an operation of decreasing the lock request count by one.

For example, the lock status manager unit 20 may be configured to manage a lock request count for every process type, by using the lock status management table shown in FIG. 5.

In the example of FIG. 5, as the process type for prohibiting the switching of the active OS, the "during telephone communication", "during data communication", "during writing in a file", and "during reading a file" are pointed out, and each of the lock request counts is 1, 2, 0, and 1, respectively, Incidentally, the lock status manager unit 20 may be configured to manage arrival times of the switch lock request, and to reduce the lock request count by invalidating a switch lock request held in the table over a predetermined time after the reception thereof.

The switching permission information manager unit 21 is configured to manage information on whether or not the switch-source OS can become an OS in the suspend status (whether or not the OS in the active status can be switched) for each of the combinations of the event information and the process type, by using a "switching permission information managing table" shown in FIG. 6.

In addition, the switching permission information manager unit 21 may be configured to manage whether or not the OS in the active status can be switched and whether or not an inquiry needs to be made to a user about whether or not the OS in the active status can be switched, for the combination of the event information and the process type.

In the example of FIG. 6, if the telephone communication is being performed when the OS switch request attributable to receiving an incoming telephone call is arrived, it is set to prohibit the switching of the OS in the active status.

However, it the data communication is being performed when the OS switch request caused by receiving an incoming telephone call is arrived, the switching of the OS in the active status is set to be permitted.

On the other hand, in the example of FIG. 6, if the telephone communication is being performed when the OS switch request due to activating the application is arrived, the switching of the OS in the active status is set to be prohibited.

However, if the data communication is being performed when the OS switch request due to activating the application is arrived, the switching of the OS in the active status is set to be permitted after making an inquiry to a user.

It is to be noted that the switching permission information manager unit 21 may be configured to manage information on whether or not the OS in the active status can be switched, and whether an inquiry needs to be made to a user about whether or not the OS in the active status can be switched, for the combination of the event information and the process type, by using a table associating the "event information" with a "priority" as shown in FIG. 7A, and a table associating a "priority" with the "process type" as shown in FIG. 7B, in place of the "switching permission information managing table".

The user inquiring unit 22 is configured to make an inquiry to a user about whether or not the OS in the active status can be switched, by presenting, to the user, the event information and the process type which requests for prohibiting the switching the OS in the active status.

The switch judgment unit 23 is configured to determine whether or not the switch-source OS can become an OS in the suspend status (whether or not the OS in the active status can be switched).

Specifically, the switch judgment unit 23 determines whether or not the switch-source OS can become an OS in the suspend status (whether or not the OS in the active status can be switched), and sets OS switch prohibition data including the OS switch prohibition flag according to the determined result.

In addition, the switch judgment unit 23 determines whether or not the switch-source OS can become an OS in the suspend status (whether or not the OS in the active status can be switched), in accordance with the lock request count on the lock status management table managed by the lock status manager unit 20.

For example, the switch judgment unit 23 may be configured to set the OS switch prohibition flag, only in a case where the lock request count is one or more when the lock request count on the lock status management table managed by the lock status manager unit 20 is referred.

In addition, the switch judgment unit 23 may determine whether or not the switch-source OS can become an OS in the suspend status (whether or not the OS in the active status can be switched), in response to the notification from the activity notifying unit 17.

In addition, the switch judgment unit 23 may determine whether or not the switch-source OS can become an OS in the suspend status (whether or not the OS in the active status can be switched), in accordance with the executing process which is being executed in the monitored OS1.

In addition, the switch judgment unit 23 may determine whether or not the switch-source OS can become an OS in the suspend status (whether or not the OS in the active status can be switched), in accordance with the combination of the process type which specifies the executing process determined as being executed, and the notified event information by referring to the switching permission information manager unit 21.

For example, the switch judgment unit 23 may set the OS switch prohibition flag, only in a case where one or more prohibitions of switching the OS in the active status are set for the combination of the event information and the process type which are included in the OS switch request, by referring to the switching permission information manager unit 21.

The switch judgment unit 23 determines whether or not the switch-source OS can become an OS in the suspend status (whether or not the OS in the active status can be switched), in response to the result of making an inquiry to a user.

For example, the switch judgment unit 23 may set a user inquiring flag if an inquiry to a user is set to be necessary when referring to the switching permission information manager unit 21.

In addition, the switch judgment unit 23 may be configured to determine whether or not the switch-source OS2 can become an OS in the suspend status, in accordance with the priority of the received switch lock request and the priority of the received OS switch request.

For example, the switch judgment unit 23 determines that the switch-source OS2 can become an OS in the suspend status, if the priority of the received switch lock request is higher than the priority of the OS switch request.

Operation of Computer System According to First Embodiment of the Present Invention By referring to FIGS. 8 to 11, the operation of the computer system 1 according this embodiment will be described below.

First, by referring to FIG. 8, an OS switching procedure (a procedure of switching an OS in the active status from OS1 to OS2) in the computer system 1 according to this embodiment will be described.

As shown in FIG. 8, at step S100, the OS switch request receiver unit 11 of the OS switching control device 10A receives an OS switch request including event information indicating a cause of switching the OS in the active status from an event source such as an application, middleware, or a driver.

Then, at step S101, the OS switch request receiver unit 11 holds the received OS switch request.

At step S102, the switch event notifying unit 12 of the OS switching control device 10A notifies the event information included in the OS switch request, to the OS2 being the switch-source OS.

At step S103, the OS switch judgment unit 23 of the OS switching control device 10A determines whether or not the switch-source OS can become an OS in the suspend status (whether or not the OS in the active status can be switched), and then sets OS switch prohibition data.

The determination whether or not the above-mentioned switch-source OS can become an OS in the suspend status (whether or not the OS in the active status can be switched) will be described later by referring to FIG. 9.

At step S104, the switch prohibition data notifying unit 16 of the OS switching control device 10A notifies the OS switch prohibition data to the OS switching function 2.

At step S105, the OS switch controller unit 13 of the OS switching control device 10A terminates the present procedure without switching the OS in the active status, if the OS switch prohibition flag is set in the OS switch prohibition data.

On the other hand, at step S107A, the OS switch controller unit 13 of the OS switching control device 10A selects and executes the switch process of the switch-source OS in accordance with the event information, if the OS switch prohibition flag is not set in the OS switch prohibition data at step S105.

Thereafter, at step S107B, the switch controller unit 13 of the OS switching control device 10A deletes all of the OS switch requests held by the OS switch request receiver unit 11.

Then, at step S108, the switch controller unit 13 calls the OS switching function 2, by using the event information as an argument.

At step S109, the OS1 being currently in the active OS becomes an OS in the suspend status, and control is shifted to the OS2 being the switch-destination OS.

When the OS2 is resumed at step S110, at step S111, the switch event acquiring unit 14 of the OS switching control device 10B for the OS2 acquires the event information notified by the OS1 being the switch-source OS.

At step S112A, the event processor unit 15 of the OS switching control device 10B executes the switch process of the switch-destination OS selected in accordance with the acquired event information.

At step S112B, the event processor unit 15 executes the event process corresponding to the acquired event information by utilizing the table shown in FIG. 3.

As described above, the active OS (OS1) accepts an incoming telephone call or a incoming mail, which is addressed to the inactive OS (OS2), and then passes the incoming telephone call or the incoming mail to the inactive OS (OS2).

Then, the inactive OS (OS2) is switched to the active OS, and thus the telephone communication or data communications can be carried out on the OS2 that is the switch-destination OS.

Secondly, by referring to FIG. 9, description will be given of a procedure of determining whether or not an OS can be switched (when the OS in the active status is switched from the OS1 to the OS2) in the computer system 1 according to the present embodiment.

As shown in FIG. 9, at step S201, the switch judgment unit 23 of the OS switching control device 10A refers to the lock request count by referring to the lock status manager unit 20.

At step S202, if the lock request count is not "0", the present operation proceeds to step S206, and if the lock request count is "0", the present operation proceeds to step S203.

At step S203, the operation inspector unit 18 of the OS switching control device 10A refers to the "operating status management table" shown in FIG. 4.

At step S204, the operation inspector unit 18 monitors whether or not the process of prohibiting the switching of the OS in the active status (the process specified by the "process type") is being executed.

At step S205, when it is determined that the above-mentioned process is being executed, the present operation proceeds to step S206, and when it is determined that the above-mentioned process is not being executed, the present operation proceeds to step S207.

At step 206, the switch prohibition data notifying unit 16 of the OS switching control device 10A sets an OS switch prohibition flag in the OS switch prohibition data.

On the other hand, at step S207, the switch prohibition data notifying unit 16 of the OS switching control device 10A resets the OS switch prohibition flag in the OS switch prohibition data.

Thirdly, by referring to FIG. 10, another procedure of determining whether or not an OS can be switched (when the OS in the active status is switched from the OS1 to the OS2) in the computer system 1 according to this embodiment will be described.

Figure 10:
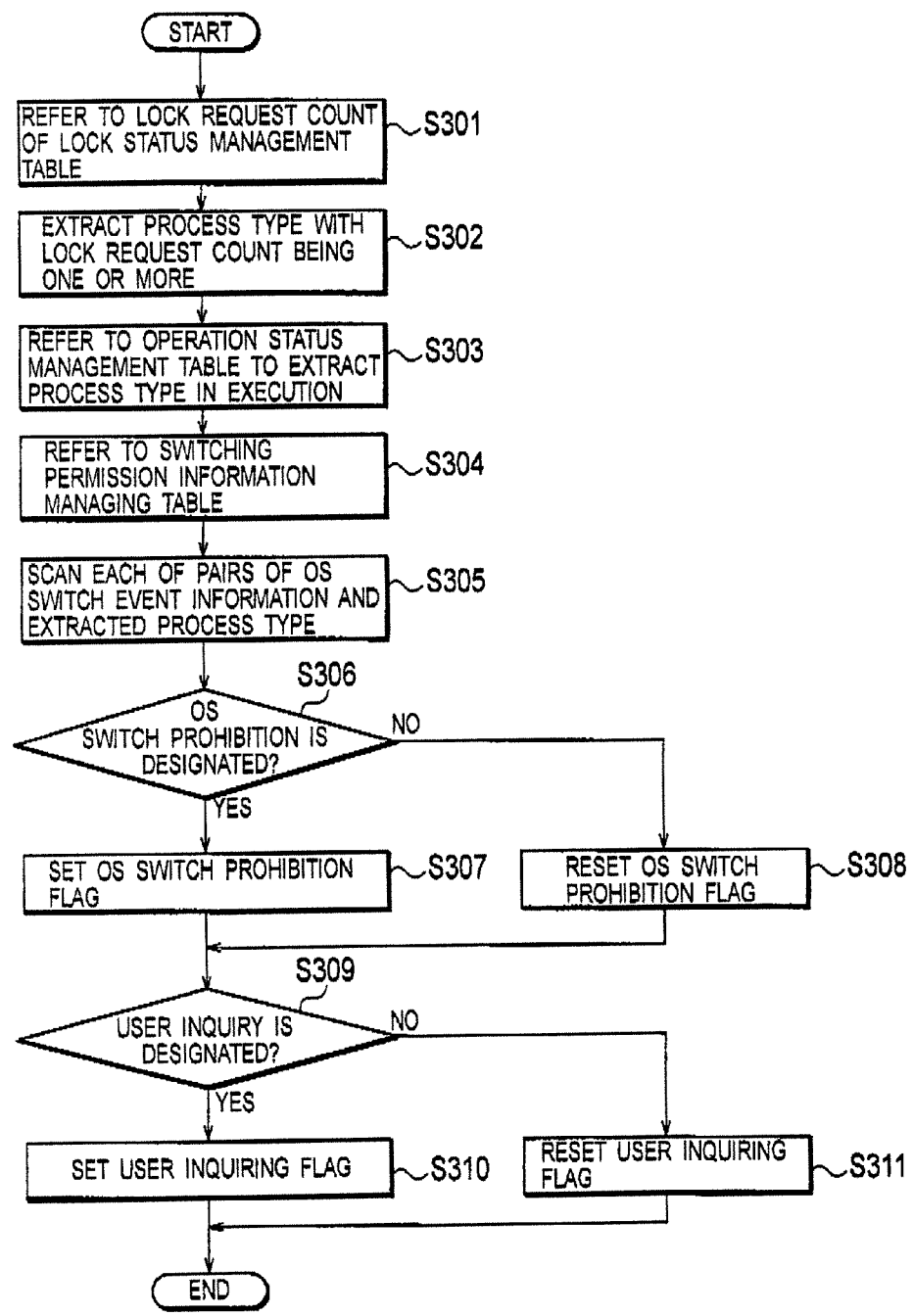
FIG. 10 is a flowchart showing another procedure of determining whether or not the OS can be switched in the computer system according to the first embodiment of the present invention.

As shown in FIG. 10, at step S301, the switch judgment unit 23 of the OS switching control device 10A refers to the lock request count, by referring to the "lock status management table (see, FIG. 5)" in the lock status manager unit 20.

At step S302, the switch judgment unit 23 of the OS switching control device 10A extracts the process type with the lock request count being "1" or more.

At step S303, the operation inspector unit 18 of the OS switching control device 10A extracts the executing process which is being executed, by referring to the "operating status management table" shown in FIG. 4.

At step S304, the switch judgment unit 23 of the OS switching control device 10A refers to the "switching permission information managing table" shown in FIG. 6.

At step S305, the switch judgment unit 23 scans all of the combinations of the event information included in the notified OS switch request and the process type specifying the extracted executing process, and then determines whether or not the switch-source OS can become the OS in the suspend status (whether or not the prohibition of the switching the OS in the active status is designated).

If one or more prohibitions of the switching the OS in the active status are designated at step S306, the switch prohibition data notifying unit 16 of the OS switching control device 10A sets, at step S307, an OS switch prohibition flag in the OS switch prohibition data.

On the other hand, if one or more prohibitions of switching the OS in the active status are not designated at step S306, the switch prohibition data notifying unit 16 of the OS switching control device 10A resets, at step S308, the OS switch prohibition flag in the OS switch prohibition data.

At step S309, if it is set in the "switching permission information table" that an inquiry needs to be made to a user about whether or not the switch-source OS can become the OS in the suspend status at step S309, the switch judgment unit 23 of the OS switching control device 10A sets a user inquiring flag, at step S310.

On the other hand, if it is not set in the "switching permission information table" that an inquiry needs to be made to a user about whether or not the switch-source OS can become the OS in the suspend status at step S309, at step S311, the switch judgment unit 23 of the OS switching control device 10A resets the user inquiring flag.

Fourthly, by referring to FIG. 11, description will be given of a procedure of receiving a switch lock request in the computer system according to the first embodiment of the present invention.

Figure 11:
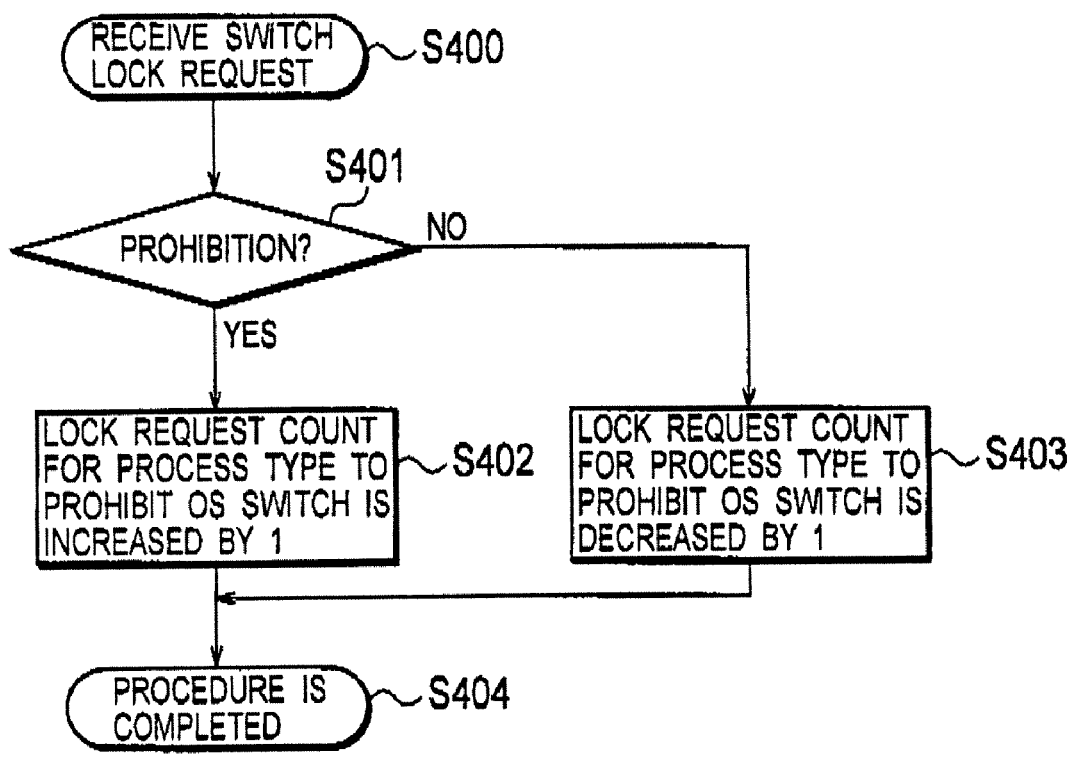
FIG. 11 is a flowchart showing a procedure of receiving a switch lock request in the computer system according to the first embodiment of the present invention.

As shown in FIG. 11, at step S400, the switch lock request receiver unit 19 of the OS switching control device 10A receives the above-mentioned switch lock request.

At step S401, if the received switch lock request requests the prohibition of the switching the OS in the active status, the lock status manager unit 20 of the OS switching control device 10A increases, at step S402, the lock request count corresponding to the process type designated by the switch lock request by "1".

On the other hand, at step S401, if the received switch lock request requests to stop prohibiting the switching of the OS in the active status, the lock status manager unit 20 of the OS switching control device 10A decreases, at step S403, the lock request count corresponding to the process type designated by the switch lock request by "1".

Fifthly, by referring to FIG. 12, description will be given of an operation of receiving an incoming telephone call will be described as one example of a switch event which occurs in the computer system according to the first embodiment of the present invention.

As shown in FIG. 12, when an incoming telephone call signal is received for the OS1 in the active status, at step S1000, the OS1 performs an interrupting process, at step S1001, and then activates a telephone driver, at step S1002.

At step S1003, the telephone driver of the OS1 determines a destination of an incoming telephone call signal, in accordance with a call-destination number and a call-source number included in the incoming telephone call signal.

At step S1004, if the destination of the above-mentioned incoming telephone call signal is the OS1, the present operation proceeds to step S1005, If the destination of the above-mentioned incoming telephone call signal is the OS2, the present operation proceeds to step S1010.

At step S1005, the telephone driver of the OS1 requests an application manager unit (not shown) to activate (start) a telephone application.

At step S1006, the telephone application displays a name of a caller (a calling-source) and reproduces a ring tone.

If a user responds to the above-mentioned incoming telephone call signal, at step S1007, the telephone application starts telephone communication process, at step S1008, and when the telephone communication is finished at step S1009, the telephone application stops.

On the other hand, at step S1010, the OS switch request receiver unit 11 of the OS switching control device 10A for the OS1 receives an OS switch request from the telephone driver.

At step S1011, the switch event notifying unit 12 of the OS switching control device 10A for the OS1 notifies the OS2 of the switch event indicating that an incoming telephone call is received, by using a function "OS_Switch_Event (event, cmd)" in accordance with the API.

In the above-mentioned example, an argument (event, cmd) is set to (PHONE, RETURN).

At step S1012, the switch controller unit 13 of the OS switching control device 10A for the OS1 selects and executes the switch process of the switch-source OS, in accordance with the received event information, designates the above-mentioned argument (PHONE, RETURN), and calls the OS switching function 2.

At step S1013, the OS switching function 2 switches the OS in the active status from the OS1 to the OS2.

At step S1014, the OS2 is resumed, and at step S1015, the OS2 activates the event processor unit 15 of the OS switching control device 10B for the OS2.

At step S1016, the event processor unit 15 of the OS switching control device 10B selects and executes the switch process of the switch-destination OS, in accordance with the received event information, and executes the event process by using the above-mentioned argument (PHONE, RETURN).

At step S1017, the telephone driver of the OS2 is activated by the event processor unit 15 of the OS switching control device 10B.

At step S1018, the telephone driver of the OS2 requests an application manager unit (not shown) to activate a telephone application.

At step S1019, the telephone application displays a name of a caller (a calling-source) and reproduces a ring tone.

If the user responds to the above-mentioned incoming telephone call signal, at step S1020, the telephone application starts telephone communication process, at step S1021.

At step S1022, when the telephone communication is finished, the telephone application notifies the application manager unit of the telephone communication being finished, and then stops the process.

At step S1023, the application manager unit notifies the event processor unit 15 of the OS switching control device 10B of the fact that the telephone communication process by the telephone application is finished.

At step S1024, the event processor unit 15 of the OS switching control device 10B determines to return the OS in the active status from the OS2 to the OS1, based on the above-mentioned argument (RETURN), and at step S1025, the OS in the active status is switched from the OS2 to the OS1.

Sixthly, by referring to FIG. 13, description will be given of an operation when an incoming message (a device management (DM) message) of an SMS (Short Message Service) for DM is received as one example when a switch event occurs in the computer system according to the first embodiment of the present invention.

As shown in FIG. 13, when the incoming DM message is received for the OS1 in the active status at step S2000, at step S2001, the OS1 performs an interruption process, and at step S2002, it starts a network (NW) driver.

At step S2003, the NW driver of the OS1 determines a destination of the above-mentioned incoming DM message in accordance with an address included in the incoming DM message.

It the destination of the above-mentioned incoming DM message is the OS1, the present operation proceeds to step S2005.

If the destination of the above-mentioned incoming DM message is the OS2, the present operation proceeds to the step S2007.

At step S2005, the NW driver of the OS1 requests an application manager unit (not shown) to activate a DM agent.

At step S2006, the DM agent executes and stops a predetermined process.

On the other hand, the OS switch request receiver unit 11 of the OS switching control device 10A for the OS1 receives an OS switch request from the NW driver.

At step S2008, the switch event notifying unit 12 of the OS switching control device 10A for the OS1 notifies the OS2 of the switch event indicating that the incoming DM message is received by using a function "OS_Switch_Event (event, cmd)", in accordance with the API.

In the above-mentioned example, an argument (event, cmd) is set to (DM, RETURN).

At step S2009, the switch controller unit 13 of the OS switching control device 10A for the OS1 selects and executes the switch process of the switch-source OS, in accordance with the received event information, designates the above-mentioned argument (DM, RETURN), and calls the OS switching function 2.

At step S2010, the OS switching function 2 switches the OS in the active status from the OS1 to the OS2.

At step S2011, the OS2 is resumed, and at step S2012, the OS2 activates the event processor unit 15 of the OS switching control device 10B for the OS2.

At step S2013, the event processor unit 15 of the OS switching control device 10B selects and executes the switch process of the switch-destination OS, in accordance with the received event information, and executes the event process, by using the above-mentioned argument (DM, RETURN).

Then, at step S2014, an NW driver of the OS2 is activated by the event processor unit 15 of the OS switching control device 10B.

At step S2015, the NW driver of the OS2 requests an application manager unit (not shown) to activate a DM agent.

At step S2016, the DM agent executes a predetermined process, and when the execution of the predetermined process is finished at step S2017, the DM agent notifies the application manager unit of the process being finished, and then stops the process.

At step S2018, the application manager unit notifies the event processor unit 15 of the OS switching control device 10B of the fact that the predetermined process by the DM agent is finished.

At step S2019, the event processor unit 15 of the OS switching control device 10B determines the fact that the OS in the active status is returned from the OS2 to the OS1, in accordance with the above-mentioned argument (RETURN), and at step S2020, the OS in the active status is switched from the OS2 to the OS1.

Advantageous Effects of Computer System According to First Embodiment of the Present Invention Since the computer system 1 according to this embodiment is configured so that the switch-source OS1 in the active status notifies the switch-destination OS2 of event information indicating a switch event, it is possible to perform an appropriate process in accordance with the above-mentioned event, after the OS2 becomes in the active status.

In addition, since the computer system 1 according to this embodiment is configured to execute the switch process of the switch-source OS and the switch-destination OS, which are selected corresponding to the event information, at the time of switching the OSs, it is possible to reduce a time required for switching the OS by changing the switch process very flexibly corresponding to the switch event.

In addition, since the computer system 1 according to this embodiment is configured to pass the event information to the OS switching function 2, it is possible to reduce a time required for switching the OS by causing the OS switching function 2 to optimize the switch process of the OS.

The computer system 1 according to this embodiment does not execute the switching of the OS in the active status if the switch controller unit 13 determines that the OS in the active status cannot be switched, so that a failure resulting from the switching of the switch-source OS to be in the suspend status can be prevented.

According to the computer system 1 of this embodiment, the OS switching function 2 can determine whether or not the switching of the OS in the active status is executed by using the OS switch prohibition data notified by the switch prohibition data notifying unit 16.

In other words, the OS switching function 2 can determine whether or not the switching of the OS in the active status is executed, by using the detailed information given by the OS switching control device 10A, since the OS switching function 2 itself does not know about the process being executed in the OS1.

According to the computer system 1 of this embodiment, the OS switching function 2 can detect a failure of the OS switching control device 10A.

Accordingly, the OS switching function 2 can determine whether or not the switching of the OS in the active status can be performed after considering the failure of the OS switching control device 10A, even if the OS switching control device 10A makes a notification of the prohibition of the switching the OS in the active status, and thereafter the prohibition of the switching the OS in the active status becomes disable to be unlocked due to the failure of the OS switching control device 10A.

The computer system 1 according to this embodiment prohibit the switching of the OS in the active status while an application or a function which could cause a failure due to the switching of the OS1 in the active status, so that a failure or an abnormal operation can be prevented.

The computer system 1 according to this embodiment can monitor the execution in of a specific process, such as a critical process, a network connection with a specific destination, or a writing process to a specific file or storage region.

The computer system 1 according to this embodiment can lock the switching of the OS in the active status in accordance with a request from an OS, a driver, an application, middleware, or the like.

Accordingly, the failure due to the switching of the OS in the active status can be prevented, and thereby improving stability.

The computer system 1 according to this embodiment can precisely determine whether or not the OS in the active status can be switched by considering the combination of the executing process being executed on the switch-source OS1 and the event information included in the OS switch request.

The computer system 1 according to this embodiment can control permission or prohibition of the switching the OS in the active status after making an inquiry to a user, so that it is possible to control the switching of the OS in the active status with the user's intention reflected.

According to the computer system 1 of this embodiment, even if a driver, middleware or the like of the requesting-source which requests to lock the switching of the OS in the active status does not properly request to unlock the lock due to the failure, the above-mentioned lock can be unlocked after a predetermined period of time passes.

According to the computer system 1 of this embodiment, the first OS in the suspend status can process the above-mentioned event by driving the switching of the OS in the active status when an interesting event happens even if the second OS is the OS in the active status.

Computer System According to Second Embodiment of the Present Invention

By referring to FIG. 14, a computer system 1 according to a second embodiment of this embodiment will be described.

The computer system 1 according to this embodiment is configured to mount a plurality of virtual OS1 and OS2, which exclusively become in the active status, and to switch an OS in the active status (an active OS) by an OS switching function 2 for switching among the plurality of virtual OSs.

FIG. 14 shows a configuration diagram of the computer system according to this embodiment.

In this embodiment, it is assumed that a single OS with a plurality of setting modes provides a plurality of virtual OSs, and the OS1 and OS2 are to be executed as a same OS program.

When the OS is switched, by the OS switching function 2, a status of an OS or an application when the switch-source OS is in the active status is suspended (saved), and a status of an OS or an application saved when the switch-destination OS is in the active status is resumed (restarted).

Figure 14A:
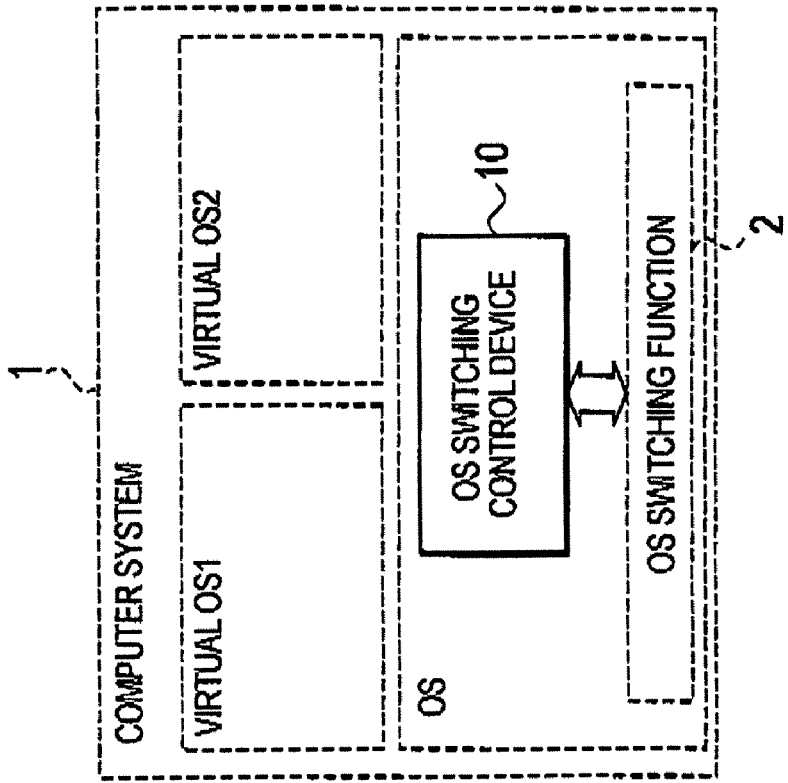
FIGS. 14A and 14B are configuration diagrams of a computer system according to a second embodiment.

FIG. 14A shows an example of a configuration in which the OS switching function 2 is arranged in an execution environment independent from the OS.

In the example shown in FIG. 14A, the execution environment independent from a normal OS can be provided on the computer system which supports the "TrustZone", and the OS switching function 2 can be arranged in the execution environment.

Figure 14B:
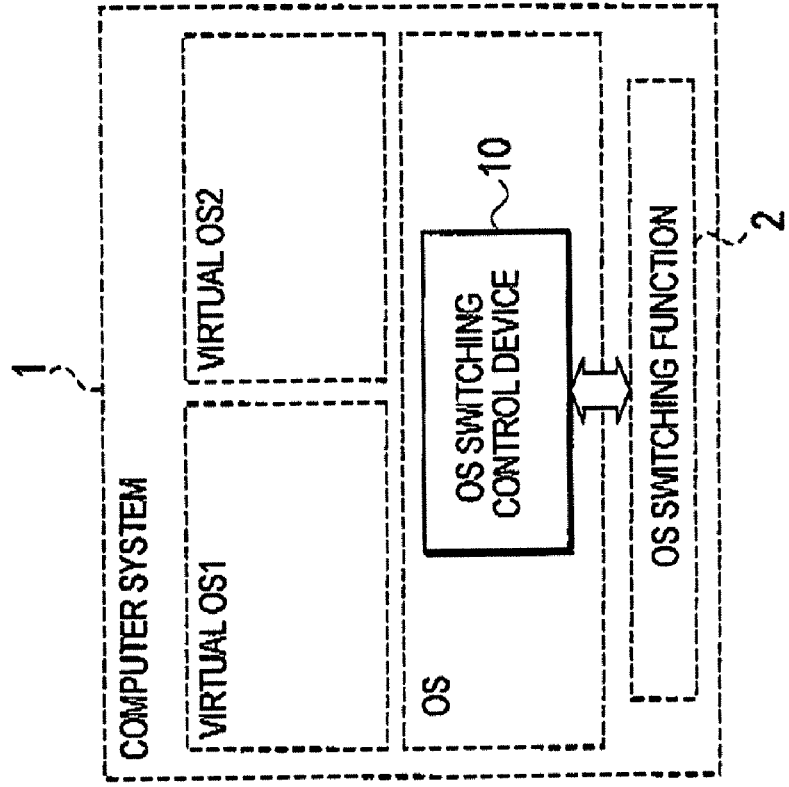

FIG. 14B shows an example of a configuration in which the OS switching function 2 is arranged inside the OS.

In the example shown in FIG. 14B, the OS switching function 2 may be implemented in any form of a device driver, a server, an application, and the like.

FIG. 14 shows the configuration in which the OS switching control device 10 is arranged inside the OS, but similar to the OS switching function 2, it may be arranged in an execution environment independent from the OS.

The configuration, motion, operation, and effect of the above-mentioned OS switching control device 10A are same as those of the above-mentioned first embodiment, and therefore the description thereof will be omitted.

According to the present invention, it is possible to provide a OS switching control device and a computer system, which are capable of executing the switch processes of the switch-source OS and the switch-destination OS which are selected in accordance with to event information, while reducing a time required for switching from a switch-source OS to a switch-destination OS and a time required for performing a process for a switch event addressed to is an inactive OS. In order to reduce these times, the operating system switching control device and the computer system are capable of changing the switch process very flexibly in response to an occurring switch event by allowing the switch processes corresponding to the event information to be optimized.

According to the present invention, it is possible to provide an operating system switching control device and a computer system, which are capable of executing safely the switching of an OS in the active status by checking whether or not a process to prohibit the switching of the OS in the active status is being executed.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. An operating system switching control device provided in a computer system having an operating system switching function of exclusively switching an operating system in an active status from a switch-source operating system to a switch-destination operating system, comprising:

a processor;

a switch-source operating system controller unit configured to operate when the switch-source operating system is in the active status, the switch-source operating system controller unit including the processor having an operating system switch request receiver unit configured to receive an operating system switch request for requesting that the switch-destination operating system in a suspend status becomes the operating system in the active status, a switch event notifying unit configured to notify event information, which is included in the received operating system switch request, to the switch-destination operating system or an application on the switch-destination operating system for requesting the switch-destination operating system or the application on the switch-destination operating system to perform a process in accordance with the event information, and a switch controller unit configured to call the operating system switching function, by using the event information as an argument, so that the switch-destination operating system becomes the operating system in the active status, wherein the switch-source operating system controller unit includes a switch judgment unit configured to determine whether the switch-source operating system can become the operating system in a suspend status, when it is determined that the switch-source operating system can become the operating system in the suspend status, the switch controller unit is configured to instruct the operating system switching function that the switch-destination operating system becomes the operating system in the active status, the switch-source operating system controller unit includes an operation inspector unit configured to monitor executing processes which are being executed in the switch-source operating system, the switch judgment unit is configured to determine whether the switch-source operating system can become the operating system in the suspend status, in accordance with the executing process, the switch-source operating system controller unit includes a switching permission information manager unit configured to manage information on whether the switch-source operating system can become the operating system in the suspend status, for a combination of the event information and a process type for specifying the executing process, the operation inspector unit is configured to monitor whether a process specified by the process type is being executed in the switch-source operating system, and the switch judgment unit is configured to determine whether the switch-source operating system can become the operating system in the suspend status, in accordance with the combination of the process type for specifying the executing process and the notified event information, defined in the switching permission information manager unit.

2. An operating system switching control device provided in a computer system having an operating system switching function of exclusively switching an operating system in an active status from a switch-source operating system to a switch-destination operating system, comprising:

a processor;

a switch-source operating system controller unit configured to operate when the switch-source operating system is in the active status, the switch-source operating system controller unit including the processor having an operating system switch request receiver unit configured to receive an operating system switch request for requesting that the switch-destination operating system in a suspend status becomes the operating system in the active status, a switch event notifying unit configured to notify event information, which is included in the received operating system switch request, to the switch-destination operating system or an application on the switch-destination operating system for requesting the switch-destination operating system or the application on the switch-destination operating system to perform a process in accordance with the event information, and a switch controller unit configured to call the operating system switching function, by using the event information as an argument, so that the switch-destination operating system becomes the operating system in the active status, wherein the switch-source operating system controller unit includes a switch judgment unit configured to determine whether the switch-source operating system can become the operating system in a suspend status, when it is determined that the switch-source operating system can become the operating system in the suspend status, the switch controller unit is configured to instruct the operating system switching function that the switch-destination operating system becomes the operating system in the active status, the switch-source operating system controller unit includes an operation inspector unit configured to monitor executing processes which are being executed in the switch-source operating system, the switch judgment unit is configured to determine whether the switch-source operating system can become the operating system in the suspend status, in accordance with the executing process, the switch-source operating system controller unit includes a switching permission information manager unit configured to manage information on whether the switch-source operating system can become the operating system in the suspend status, for a combination of the event information and a process type for specifying the executing process, the operation inspector unit is configured to monitor whether a process specified by the process type is being executed in the switch-source operating system, the switch judgment unit is configured to determine whether the switch-source operating system can become the operating system in the suspend status, in accordance with the combination of the process type for specifying the executing process and the notified event information, defined in the switching permission information manager unit, a switch lock request receiver unit is configured to receive a switch lock request for every process type, and the switch judgment unit is configured to determine whether the switch-source operating system can become the operating system in the suspend status, in accordance with the combination of the process type corresponding to the switch lock request and the notified event information, by referring to the switching permission information manager unit.

3. An operating system switching control device provided in a computer system having an operating system switching function of exclusively switching an operating system in an active status from a switch-source operating system to a switch-destination operating system, comprising:

a processor;

a switch-source operating system controller unit configured to operate when the switch-source operating system is in the active status, the switch-source operating system controller unit including the processor having an operating system switch request receiver unit configured to receive an operating system switch request for requesting that the switch-destination operating system in a suspend status becomes the operating system in the active status, a switch event notifying unit configured to notify event information, which is included in the received operating system switch request, to the switch-destination operating system or an application on the switch-destination operating system for requesting the switch-destination operating system or the application on the switch-destination operating system to perform a process in accordance with the event information, and a switch controller unit configured to call the operating system switching function, by using the event information as an argument, so that the switch-destination operating system becomes the operating system in the active status, wherein the switch-source operating system controller unit includes a switch judgment unit configured to determine whether the switch-source operating system can become the operating system in a suspend status, when it is determined that the switch-source operating system can become the operating system in the suspend status, the switch controller unit is configured to instruct the operating system switching function that the switch-destination operating system becomes the operating system in the active status, the switch-source operating system controller unit includes an operation inspector unit configured to monitor executing processes which are being executed in the switch-source operating system, the switch judgment unit is configured to determine whether the switch-source operating system can become the operating system in the suspend status, in accordance with the executing process, the switch-source operating system controller unit includes a switching permission information manager unit configured to manage information on whether the switch-source operating system can become the operating system in the suspend status, for a combination of the event information and a process type for specifying the executing process, the operation inspector unit is configured to monitor whether a process specified by the process type is being executed in the switch-source operating system, the switch judgment unit is configured to determine whether the switch-source operating system can become the operating system in the suspend status, in accordance with the combination of the process type for specifying the executing process and the notified event information, defined in the switching permission information manager unit, the switch-source operating system controller unit includes a user inquiring unit configured to make an inquiry to a user about whether the switch-source operating system can become the operating system in the suspend status, the switching permission information manager unit is configured to manage, for the combination of the event information and the process type, whether an inquiry needs to be made to a user about whether the switch-source operating system can become the operating system in the suspend status, and the switch judgment unit is configured to determine whether the switch-source operating system can become the operating system in the suspend status, in accordance with a result of making the inquiry to the user.

* * * * *